(12) United States Patent
Nonnenmacher et al.

(10) Patent No.: US 12,460,982 B2
(45) Date of Patent: Nov. 4, 2025

(54) METHOD FOR MANUFACTURING A PRESSURE SENSOR HAVING A PRESSURE-SENSITIVE MEDIUM, AND PRESSURE SENSOR

(71) Applicant: Robert Bosch GmbH, Stuttgart (DE)

(72) Inventors: Dorothee Nonnenmacher, Leinfelden-Echterdingen (DE); Elmar Kroner, Tamm (DE); Friedhelm Guenter, Burgstetten (DE); Joachim Friedl, Reutlingen (DE); Joachim Kreutzer, Stuttgart (DE); Klaus-Volker Schuett, Wernau (DE); Lars Sodan, Balingen (DE); Michael Raedler, Hamburg (DE); Patrick Stihler, Schlaitdorf (DE); Raschid Baraki, Reutlingen (DE); Steven Maul, Stuttgart (DE); Yang Zou, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 307 days.

(21) Appl. No.: 18/249,035

(22) PCT Filed: Nov. 24, 2021

(86) PCT No.: PCT/EP2021/082757
§ 371 (c)(1),
(2) Date: Apr. 13, 2023

(87) PCT Pub. No.: WO2022/112288
PCT Pub. Date: Jun. 2, 2022

(65) Prior Publication Data
US 2023/0393009 A1 Dec. 7, 2023

(30) Foreign Application Priority Data
Nov. 25, 2020 (DE) ............... 10 2020 214 765.5

(51) Int. Cl.
*G01L 19/06* (2006.01)
*G01L 9/00* (2006.01)

(52) U.S. Cl.
CPC ........ *G01L 19/0645* (2013.01); *G01L 9/0041* (2013.01)

(58) Field of Classification Search
CPC ..................... G01L 19/0645; G01L 9/0041
See application file for complete search history.

(56) References Cited

U.S. PATENT DOCUMENTS

| 4,732,042 A | 3/1988 | Adams |
| 4,993,265 A * | 2/1991 | Koen .................. G01L 19/0627 361/283.4 |
| 6,214,634 B1 | 4/2001 | Osajda et al. |

FOREIGN PATENT DOCUMENTS

EP 3392634 A2 10/2018

OTHER PUBLICATIONS

International Search Report for PCT/EP2021/082757, Issued Feb. 23, 2022.

* cited by examiner

*Primary Examiner* — Paul M. West
(74) *Attorney, Agent, or Firm* — NORTON ROSE FULBRIGHT US LLP

(57) ABSTRACT

A method for manufacturing a pressure sensor having a pressure-sensitive medium. The method includes: providing a pressure sensor having a pressure sensor element, which is arranged in a receiving space of a housing of the pressure sensor; filling the receiving space with a pressure-sensitive medium; applying a second medium, which is immiscible with the pressure-sensitive medium, to a surface of the pressure-sensitive medium; forming a membrane in a boundary region between the pressure-sensitive medium and the second medium by way of a phase-transfer reaction (Continued)

between a first reactant and a second reactant, at least the first reactant or the second reactant being dissolved in the pressure-sensitive medium or in the second medium. A pressure sensor manufactured by the method is also described.

12 Claims, 3 Drawing Sheets

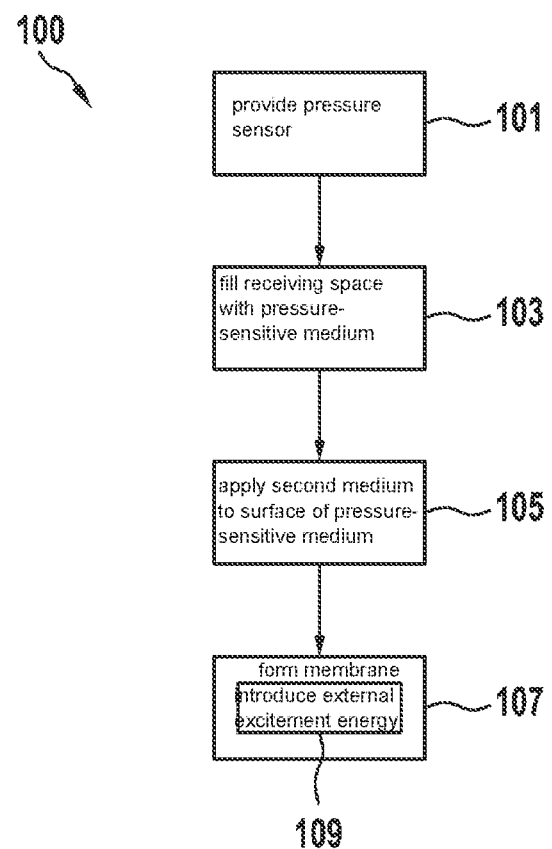

METHOD FOR MANUFACTURING A PRESSURE SENSOR HAVING A PRESSURE-SENSITIVE MEDIUM, AND PRESSURE SENSOR

FIELD

The present invention relates to a method for manufacturing a pressure sensor having a pressure-sensitive medium. The present invention further relates to a pressure sensor manufactured by the method.

BACKGROUND INFORMATION

Pressure sensors have found widespread use in smartphones and smart watches. Driven by new applications, such as indoor navigation or tracking of fitness exercises, for example, the requirements in terms of the measuring accuracy of pressure sensors are constantly increasing. At the same time, new device generations, and hence also pressure sensors, are designed to be media-tight and dirt-repellent. Structural and connection concepts are thus a critical differentiating feature for high-precision, media-tight consumer pressure sensors. It is also essential for pressure sensors to remain as free from contamination as possible over their lifetime in order to ensure trouble-free functionality. The exposed surfaces required for the sensor mechanism should therefore be as resistant as possible to contamination. There are currently a number of approaches to the design of pressure sensors.

One approach involves covering sensitive components of the pressure sensor, especially the MEMS sensor element, with a pressure-sensitive medium. The pressure-sensitive medium is responsible for transmitting the pressure from the surface to the sensor and thus needs to be as incompressible as possible. The medium also serves to protect the MEMS against corrosion or contamination, for example. In the related art, gels, among other things, are used as the medium, the surface of the gel medium serving as a contact to the external environment of the sensor and being exposed to a wide variety of influences.

However, most gel-based sensors do not have sufficient sensitivity, or their surface tends to become contaminated. For that reason, there is a need to develop new concepts for enclosing and sealing pressure sensors which improve the functionality of the sensor.

SUMMARY

An object of the present invention is to provide a method for manufacturing a pressure sensor having a pressure-sensitive medium, which eliminates the disadvantages in the related art. A further object of the present invention is to provide an improved pressure sensor having a pressure-sensitive medium.

This problem may be solved by the method and the pressure sensor of the present invention. Advantageous embodiments of the present invention are disclosed herein.

According to one aspect of the present invention, a method is provided for manufacturing a pressure sensor having a pressure-sensitive medium. According to an example embodiment of the present invention, the method includes:

providing a pressure sensor having a pressure sensor element which is arranged in a receiving space of a housing of the pressure sensor;

filling the receiving space with a pressure-sensitive medium; applying a second medium, which is immiscible with the pressure-sensitive medium, to a surface of the pressure-sensitive medium;

forming a membrane in a boundary region between the pressure-sensitive medium and the second medium by way of a phase-transfer reaction between a first reactant and a second reactant, at least the first reactant or the second reactant being dissolved in the pressure-sensitive medium or in the second medium.

In this way, it may be possible to achieve the technical advantage that an improved method may be provided for manufacturing a pressure sensor having a pressure-sensitive medium, the medium being sealed with a membrane. The membrane may first of all prevent the pressure-sensitive medium from becoming contaminated or damaged, thereby extending the useful life of the pressure sensor. Moreover, the membrane may prevent the pressure-sensitive medium from escaping from the receiving space of the pressure sensor housing. The pressure-sensitive medium is able to protect the pressure sensor element. By sealing the receiving space with the membrane that is formed, it is possible in particular to use a liquid pressure-sensitive medium, resulting in an increased sensitivity and measuring accuracy of the pressure sensor.

According to an example embodiment of the present invention, to form the membrane, the receiving space of the pressure sensor housing is first filled with an appropriate pressure-sensitive medium. Then, a second medium is applied to a surface of the pressure-sensitive medium, the two media being immiscible, such that two separate phases consisting of the pressure-sensitive medium and the second medium are produced. At least one first reactant or second reactant of a chemical reaction is present in dissolved form in the pressure-sensitive medium or in the second medium. By applying the second medium to the surface of the pressure-sensitive medium, a phase-transfer reaction of the first and second reactants is thus triggered. The phase-transfer reaction is designed here in such a way that a membrane is formed on the surface of the pressure-sensitive medium as a reaction product of the phase-transfer reaction.

The phase-transfer reaction may be designed here in such a way that the membrane is formed on the entire surface of the pressure-sensitive medium.

Within the meaning of the application, the first and second reactants may be chemical compounds of organic chemistry.

The membrane that is formed may thus likewise be a chemical compound of organic chemistry. The membrane that is formed may have various mechanical, electrical and/or chemical properties.

According to one specific example embodiment of the present invention, the first reactant is dissolved in the pressure-sensitive medium and the second reactant is dissolved in the second medium, the formation of the membrane involving a diffusion of molecules of the first reactant into the second medium and/or a diffusion of molecules of the second reactant into the pressure-sensitive medium.

In this way, it may be possible to achieve the technical advantage that an improved method may be provided for manufacturing a pressure sensor having a pressure-sensitive medium. By dissolving the first reactant in the pressure-sensitive medium and the second reactant in the second medium, it is possible to prevent an unwanted reaction of the first and second reactants in one of the two media. The phase-transfer reaction is thus initiated solely by the application of the second medium to the surface of the pressure-sensitive medium.

By way of the diffusion of the first reactant into the second medium and/or of the second reactant into the pressure-sensitive medium, it is possible to achieve a phase-transfer reaction between the first and second reactants over as large an area as possible, and hence a substantial formation of the membrane as a product of the phase-transfer reaction.

According to one specific example embodiment of the present invention, the pressure-sensitive medium or the second medium comprises a reaction catalyst, the phase-transfer reaction being designed as a phase-transfer catalysis and the reaction catalyst being designed to initiate a chemical reaction of the first and second reactants.

In this way, it may be possible to achieve the technical advantage that, by adding the reaction catalyst, as productive as possible a phase-transfer reaction is achievable in the form of a phase-transfer catalysis. By admixing the reaction catalyst, it is thus possible to control the phase-transfer reaction between the first and second reactants in such a way that a precise control of the phase-transfer reaction and hence of the properties of the membrane formed as a product of the phase-transfer reaction is achievable by varying the amount or type of the reaction catalyst in question.

According to one specific example embodiment of the present invention, the first reactant and the second reactant are dissolved in the second medium, the reaction catalyst being dissolved in the pressure-sensitive medium, and the phase-transfer catalysis involving a diffusion of molecules of the first and second reactants into the pressure-sensitive medium and/or a diffusion of molecules of the reaction catalyst into the second medium.

In this way, it may be possible to achieve the technical advantage that as precise as possible a phase-transfer catalysis is permitted between the first and second reactants. Since only the phase-transfer catalyst is dissolved in the pressure-sensitive medium, it is possible to avoid additionally dissolving a first or second reactant in the pressure-sensitive medium, which may potentially influence a behavior of the pressure-sensitive medium after the membrane is formed. If the first or second reactant is dissolved in the pressure-sensitive medium and the membrane is formed as a product of the phase-transfer reaction between the first and second reactants, the pressure-sensitive medium has a different content of the first or second reactant dissolved in the pressure-sensitive medium before and after the membrane is formed. The concentration differences of the reactants dissolved in the pressure-sensitive medium may influence properties of the pressure-sensitive medium, as a consequence of which the measurement behavior of the pressure sensor may be adversely affected. The reaction catalyst may be designed in such a way that it merely triggers the reaction between the first and second reactants but is not itself consumed by the reaction. The concentration of reaction catalyst in the pressure-sensitive medium thus remains constant, and so the properties of the pressure-sensitive medium before and after the membrane is formed remain unchanged.

In this case, the first and second reactants are designed in such a way that the chemical reaction between the two reactants is triggered solely by the presence of the reaction catalyst, so a reaction of the first and second reactants in the second medium is not triggered.

According to one specific example embodiment of the present invention, the first reactant and the second reactant are dissolved in the pressure-sensitive medium, the reaction catalyst being dissolved in the second medium, and the phase-transfer catalysis involving a diffusion of molecules of the first and second reactants into the second medium and/or a diffusion of molecules of the reaction catalyst into the pressure-sensitive medium.

In this way, it may be possible to achieve the technical advantage that a provision of the reaction catalyst in solution in the second medium is made as simple as possible.

According to one specific example embodiment of the present invention, the reaction catalyst is suitable for lowering a reaction energy of the chemical reaction between the first and second reactants, and/or the reaction catalyst is suitable for bringing about a diffusion of the reactants from the one medium into the respective other medium.

In this way, it may be possible to achieve the technical advantage that as efficient as possible a phase-transfer reaction may be provided between the first and second reactants in the presence of the appropriately designed reaction catalyst. Owing to the different properties of the reaction catalyst, it is possible to trigger various phase transfer reactions of different reactants, allowing a broad range of possible membranes to be covered.

According to one specific example embodiment of the present invention, the membrane is a polymer membrane.

In this way, it may be possible to achieve the technical advantage that a resistant and lightweight membrane may be produced, which provides advantageous mechanical properties for covering the pressure-sensitive medium and protecting the pressure-sensitive medium from external influences, without the sensitivity of the pressure sensor being adversely affected by the membrane.

According to one specific example embodiment of the present invention, the pressure-sensitive medium comprises a liquid organic medium, particularly an oil-containing medium, the second medium being a water-containing medium having at least one liquid, gaseous or aerosol-containing phase.

In this way, it may be possible to achieve the technical advantage that, by designing the pressure-sensitive medium as a liquid organic medium, for example as an oil-containing medium, a pressure-sensitive medium having high pressure sensitivity may be provided, which offers an improved responsiveness and hence an improved transfer of the pressures acting on the surface of the pressure-sensitive medium to the pressure sensor element surrounded by the pressure-sensitive medium. A pressure sensor having improved measuring accuracy and improved measuring sensitivity may be provided in this way. By designing the second medium as a water-containing medium, a mixing of the two media may be prevented. Moreover, a medium is provided which is as cost-effective as possible and which, within the meaning of the present invention, serves exclusively as a transport medium for the respective reactants or the reaction catalyst. By designing the water-containing medium in the liquid phase, the application of the second medium in the form of a water film or water drop covering the surface of the pressure-sensitive medium may be made as simple as possible. The process of forming the membrane may be made as constant as possible in this way. Furthermore, a large amount of the first or second reactants or of the reaction catalyst may be dissolved in the liquid phase. By designing the second medium in the gaseous or aerosol-containing phase, as uniform as possible a formation process may be achieved, in that the surface is sprayed with the corresponding gaseous or aerosol-containing phases of the second medium. As uniform as possible a formation of the membrane or the thinnest possible membranes may be achieved in this way.

According to one specific example embodiment of the present invention, the membrane is connected to the housing and tightly seals the receiving space.

In this way, it may be possible to achieve the technical advantage that an escape of the pressure-sensitive medium from the receiving space of the pressure sensor housing may be prevented by the membrane connected to the housing. Moreover, the entry of contaminants into the receiving space may be prevented.

According to one specific example embodiment of the present invention, the phase-transfer reaction between the first and second reactants may be ended after a predetermined reaction time, when a mechanical property of the membrane is achieved, or once the first and/or second reactant has been consumed.

In this way, it may be possible to achieve the technical advantage that a precise control of the phase-transfer reactions between the first and second reactants, and hence a precise control of the formation of the membrane and of the associated properties of the membrane, may be achieved. The process of forming the membrane may be managed in this case by controlling the reaction time, since the phase-transfer reaction may be ended after a predetermined time by removing the second medium. Alternatively, a phase-transfer reaction may be ended by using up one of the two reactants. A precise control of the phase-transfer reaction and hence of the properties of the membrane that is formed may be achieved in this way by an appropriate choice of the amount of dissolved reactants.

According to one specific example embodiment of the present invention, the formation of the membrane further involves introducing an external excitation energy into the boundary region between the pressure-sensitive medium and the second medium, the excitation energy being equipped to promote the phase-transfer reaction and the excitation energy comprising a thermal energy and/or an energy of electromagnetic radiation.

In this way, it may be possible to achieve the technical advantage that a precise control of the phase-transfer reaction is made possible through the influence of an additional excitation energy. By introducing a thermal energy or an energy of an electromagnetic radiation into the boundary region between the two media, a reaction energy of the phase-transfer reaction and hence a course of the phase-transfer reaction may be precisely controlled. The formation of the membrane may be individually managed in this way.

According to a second aspect of the present invention, a pressure sensor is provided which is manufactured by the method according to the present invention.

Exemplary embodiments of the present invention are explained by reference to the figures.

BRIEF DESCRIPTION OF THE DRAWINGS

FIG. 1 shows a flow chart of a method for manufacturing a pressure sensor having a pressure-sensitive medium according to one specific example embodiment of the present invention.

DETAILED DESCRIPTION OF EXAMPLE EMBODIMENTS

Figure 2A:
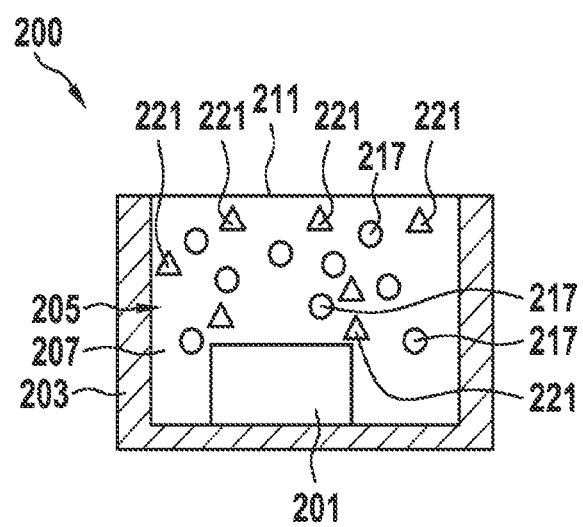
FIGS. 2A-2D show a schematic representation of the method for manufacturing a pressure sensor having a pressure-sensitive medium according to one specific example embodiment of the present invention.

FIG. 1 shows a flow chart of a method 100 for manufacturing a pressure sensor 200 having a pressure-sensitive medium 207 according to one specific embodiment.

The method in FIG. 1 is described by reference to the diagrams in FIGS. 2A-2D.

To manufacture a pressure sensor 200 having a pressure-sensitive medium 207, a pressure sensor 200 having a pressure sensor element 201, which is arranged in a receiving space 205 of a housing 203 of pressure sensor 200, is provided in a first method step 101.

Pressure sensor element 201 may be a microelectromechanical system (MEMS), for example.

Pressure sensor 200 may be an atmospheric pressure sensor, for example.

Next, in a method step 103, receiving space 205 is filled with a pressure-sensitive medium 200.

Next, in a method step 105, a second medium 209 is applied to a surface 211 of pressure-sensitive medium 207.

Then, in a method step 105, a membrane 213 is formed in a boundary region 215 between pressure-sensitive medium 207 and second medium 209 by way of a phase-transfer reaction between a first reactant 217 and a second reactant 219. At least first reactant 217 or second reactant 219 is dissolved in this case in pressure-sensitive medium 207 or in second medium 209.

The formation of the membrane in method step 107 may further involve introducing an external excitation energy 223 into boundary region 217 between pressure-sensitive medium 207 and second medium 209 in a method step 109. Excitation energy 223 is in this case equipped to promote the phase-transfer reaction between first and second reactants 217, 219 and may comprise, for example, a thermal energy or an energy of an electromagnetic radiation.

FIGS. 2A-2D show a schematic representation of method 100 for manufacturing a pressure sensor 200 having a pressure-sensitive medium 207 according to one specific embodiment.

FIGS. 2A-2D show individual steps of method 100 for manufacturing a pressure sensor 200 having pressure-sensitive medium 207 in graphical form. FIG. 2A shows a pressure sensor 200 having a pressure sensor element 201, pressure sensor element 201 being arranged in a receiving space 205 of a housing 203 of pressure sensor 200. In FIG. 2A, receiving space 205 further contains a pressure-sensitive medium 207, which was introduced into receiving space 205 in accordance with method step 103. In the specific embodiment shown, a first reactant 217 and a reaction catalyst 221 are dissolved in pressure-sensitive medium 207. The pressure-sensitive medium also has a surface 211.

The pressure-sensitive medium may be, for example, a liquid medium, particularly a liquid organic medium, for example an oil medium. First reactant 217 may be an organic chemical compound that is suitable for a phase-transfer reaction within the meaning of the present invention. Moreover, first reactant 217 is soluble in the organic liquid or oil-containing medium of pressure-sensitive medium 207. Reaction catalyst 221 may be a suitable reaction catalyst for phase-transfer reactions within the meaning of the present invention. Phase-transfer catalyst 221 is equipped in this case to trigger a corresponding phase-transfer reaction between first reactant 217 and second reactant 219. Reaction catalyst 221 may be equipped to lower a reaction energy needed in order to carry out the phase-transfer reaction. Alternatively, reaction catalyst 221 may be equipped to promote a diffusion of first and second reactants 217, 219 between pressure-sensitive medium 207 and second medium 209.

Figure 2B:
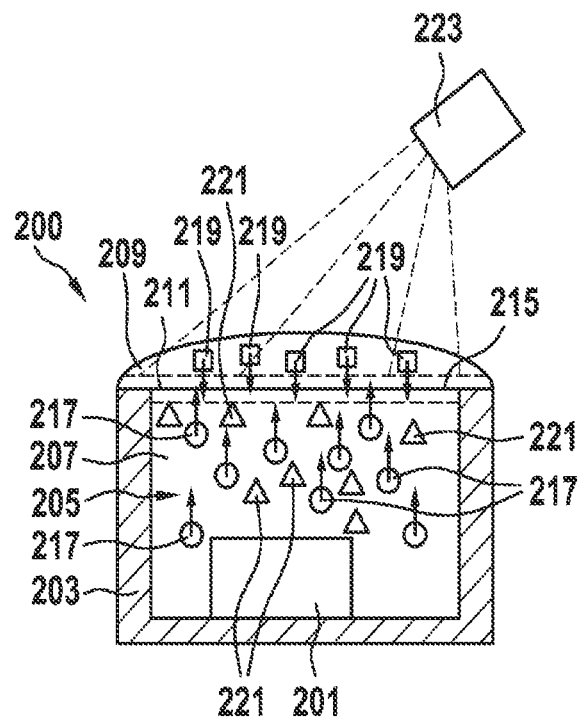

In FIG. 2B, in accordance with method step 105, a second medium 209 is applied to surface 211 of pressure-sensitive medium 207. A second reactant 219 is dissolved in second medium 209. In FIG. 2B, a diffusion of first reactant 217 out of pressure-sensitive medium 207 into a boundary region 215 between pressure-sensitive medium 207 and second medium 209 is represented by the upward arrows. Moreover, a diffusion of second reactant 209 out of second medium 209 into boundary region 215 is represented by the downward arrows. The diffusion of first reactant 217 may also include a diffusion out of pressure-sensitive medium 207 into second medium 209. In an analogous way, the diffusion may also include a diffusion of second reactant 219 out of second medium 209 into pressure-sensitive medium 207.

The diffusion of first and second reactants 217, 219 results in a phase-transfer reaction between first and second reactants 217, 219 in boundary region 215. Reaction catalyst 221, which is dissolved in pressure-sensitive medium 207, may in this case promote the reaction between first and second reactants 217, 219. In this way, reaction catalyst 221 may lower the reaction energy needed for the course of the chemical reaction between first and second reactants 217, 219. Alternatively, reaction catalyst 221 may promote the diffusion of reactants 217, 219 into boundary region 215 or into the respective other medium 207, 209. As a consequence of the phase-transfer reaction of first and second reactants 217, 219 in boundary region 215, a corresponding membrane 209 is formed as a product of the phase-transfer reaction. The formation of membrane 209 lowers the concentration of first reactant 217 in pressure-sensitive medium 207 and of second reactant 219 in second medium 209. This results in a depletion zone, which is primarily located in boundary region 215. The reduction in the concentrations of first and second reactants 217, 219 in boundary region 215 generates a further diffusion of first and second reactants 217, 219 towards boundary region 215. The phase-transfer reaction is sustained in this way. Alternatively, a diffusion of first and second reactants 217, 219 towards boundary region 215 may be generated by a mutual electrostatic attraction between first and second reactants 217, 219. The molecules of first and second reactants 217, 219 and of reaction catalyst 221 shown in FIGS. 2A-2D may be complex molecules of corresponding chemical compounds. Alternatively, the molecules of first and second reactants 217, 219 and of reaction catalyst 221 may be individual ions of the corresponding chemical compounds.

FIG. 2B also shows an excitation energy 223, which in accordance with method step 109 is introduced into boundary region 215 between pressure-sensitive medium 207 and second medium 209. In the specific embodiment shown, excitation energy 223 is formed as an electromagnetic radiation, for example a UV radiation or an infrared radiation, which is irradiated into boundary region 215 by an appropriate radiation source. Alternatively or in addition thereto, excitation energy 223 may also be in the form of a thermal energy, which is introduced into boundary region 215 by an appropriate heater, for example. Excitation energy 223 promotes the phase-transfer reaction and enables a course of the phase-transfer reaction to be controlled.

Figure 2C:
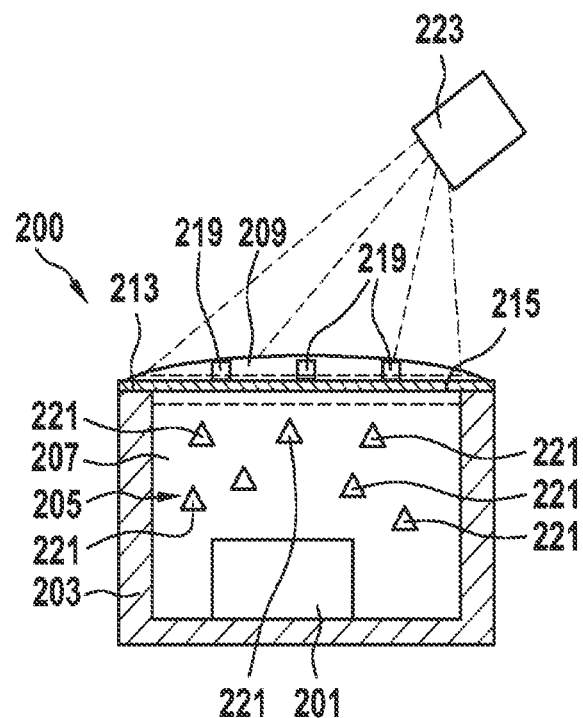

FIG. 2C shows a complete formation of a membrane 213 as the product of the phase-transfer reaction between first and second reactants 217, 219. In this case, membrane 213 extends over the entire surface of pressure-sensitive medium 207 and is connected to housing 203 of pressure sensor 200. A tight seal of receiving space 205 of housing 203 is achieved in this way, thus preventing pressure-sensitive medium 207 from escaping from receiving space 205 and/or foreign substances from entering receiving space 205.

Membrane 213 as shown may be a polymer membrane, for example. Housing 203 of pressure sensor 200 may be manufactured from a plastic, for example, such that a connection between the polymer membrane and the plastic housing is possible. Alternatively, prior to formation of the membrane in method step 107, housing 203 may be subjected to a treatment which promotes a connection between membrane 213 that is to be formed and housing 203. A connection between membrane 213 and housing 203 may be achieved by way of an adhesive bond, for example.

In addition to an adhesive action, the housing may also be connected to the membrane that is formed by way of a chemical bond, in which the housing reacts directly with the developing membrane and a mechanically stable connection is formed in accordance with adhesive interactions between the membrane and the housing. Alternatively, a connection between membrane 213 that is formed and housing 203 may be brought about by the introduction of excitation energy 223.

In FIG. 2C, in the specific embodiment shown, first reactant 217 in pressure-sensitive medium 207 is completely consumed as a result of the phase-transfer reaction and the corresponding formation of membrane 213. In the specific embodiment shown, second reactant 219 is likewise reduced from the volume fraction, but individual molecules are still present in second medium 209.

Owing to the complete consumption of first reactant 217, the phase-transfer reaction between the two reactants 217, 219 is terminated, thus ending the formation of membrane 213.

As an alternative to the specific embodiment shown, second reactant 219 in second medium 209 may be completely consumed during the phase-transfer reaction and the formation of membrane 213, while first reactant 217 is still present in a residual volume of pressure-sensitive medium 207. Alternatively, both reactants 217, 219 may be completely consumed during the phase-transfer reaction.

In the specific embodiment shown, reaction catalyst 221 is still present with an unchanged volume fraction even after the phase-transfer reaction has been completed. Alternatively, a reaction catalyst which is likewise at least partly consumed during the course of the phase-transfer reaction may be used.

Alternatively, the phase-transfer reaction and hence the formation of membrane 213 may be ended by the elapse of a predetermined reaction time. Alternatively, a phase-transfer reaction may be ended with the formation of a membrane 213 having predetermined features, such as a predetermined thickness or a predetermined mechanical rigidity, for example.

The thickness of membrane 213 and hence the mechanical properties of the membrane may be controlled through the amount of first and second reactants 217, 219 in pressure-sensitive medium 207 and in second medium 209. At the same time, a thickness of the membrane to be formed may be controlled by way of a duration of the phase-transfer reaction between reactants 217, 219.

Through the influence of excitation energy 223, the phase-transfer reaction may be controlled in such a way that a membrane having the desired properties is achieved.

As an alternative to the complete consumption of one of reactants 217, 219 or the elapse of a predetermined time or the achievement of the predetermined properties of membrane 213, the end of the phase-transfer reaction may also be brought about by adding a further reactant to second medium 209, the further reactant being equipped to interrupt the phase-transfer reaction. Alternatively, the phase-transfer reaction between reactants 217, 219 may be ended in that a diffusion of first reactant 217 dissolved in pressure-sensitive medium 207 or a diffusion of second reactant 219 dissolved in second medium 209 through membrane 213 is prevented due to the properties of membrane 213.

Alternatively, reactants 217, 219 may be designed in such a way that a diffusion of reactants 217, 219 through membrane 213 is suppressed when a desired property of membrane 213 is achieved. Alternatively, a diffusion may be permitted for the entire course of the phase-transfer reaction.

According to a specific embodiment, advantageous polymer membranes may have a thickness of between 1 µm and 100 µm, for example. A conventional reaction time for the phase-transfer reactions described may range from microseconds to several hours.

Figure 2D:
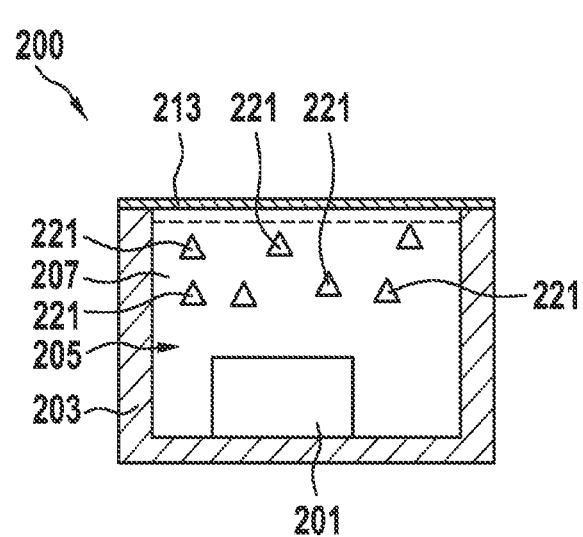

FIG. 2D shows a completed phase-transfer reaction and a fully formed membrane 213. Second medium 209 is removed from membrane 213. To this end, the second medium may either be actively removed or automatically volatilized by an evaporation process, for example. In the specific embodiment shown, unconsumed reaction catalyst 221 remains dissolved in pressure-sensitive medium 207. The method according to the present invention for manufacturing a pressure sensor 200 having pressure-sensitive medium 207 ends when the formation of membrane 213 having the desired properties is completed.

As an alternative to the specific embodiment shown in FIGS. 2A-2D, in order to carry out the phase-transfer reaction, only reaction catalyst 221 may be dissolved in pressure-sensitive medium 207, while first and second reactants 217, 219 are dissolved in second medium 209. When second medium 209 is applied, a diffusion of reactants 217, 219 out of second medium 209 into boundary region 215 and a diffusion of reaction catalyst 221 out of pressure-sensitive medium 207 into boundary region 215 may be promoted by reaction catalyst 221, such that a phase-transfer catalysis between first and second reactants 217, 219 and a corresponding formation of membrane 213 is achieved.

Alternatively, first and second reactants 217, 219 may be dissolved in pressure-sensitive medium 207, while reaction catalyst 221 is dissolved in second medium 209. A diffusion of the individual constituents and an execution of the phase-transfer reaction may take place in a manner analogous to that described above.

Where first and second reactants 217, 219 are dissolved either in pressure-sensitive medium 207 or in second medium 209, first and second reactants 217, 219 should be chosen in such a way that, in the absence of an appropriate reaction catalyst 221, a corresponding chemical reaction between first and second reactants 217, 219 does not take place.

As an alternative to the specific embodiment shown, only first reactant 217 may be dissolved in pressure-sensitive medium 207, while only second reactant 219 is dissolved in second medium 209. In this case, a phase-transfer reaction between first and second reactants 217, 219 may be brought about solely by applying second medium 209 to surface 211 of pressure-sensitive medium 207, without an additional reaction catalyst 221 being necessary for this purpose. The phase-transfer reaction may likewise proceed in this case in a manner analogous to that described above.

As an alternative to the specific embodiment shown, a plurality of different reactants may be dissolved both in pressure-sensitive medium 207 and in second medium 209, and a phase-transfer reaction may take place between the plurality of different reactants. Alternatively, a single reaction catalyst or a plurality of different reaction catalysts may be dissolved in pressure-sensitive medium 207 and/or in second medium 209 to this end. Alternatively, a phase-transfer reaction may involve a plurality of different partial reactions, in which different reactants react with one another in each case, such that a membrane is formed on the basis of a plurality of successive or parallel partial phase-transfer reactions, which combine to form an overall phase-transfer reaction.

As an alternative to the specific embodiment shown, second medium 209 may be applied in a gaseous phase to surface 211 of pressure-sensitive medium 207. In this case, reactants 217, 219 and/or reaction catalyst 221 may be dissolved in gaseous second medium 209. As an alternative thereto, second medium 209 may be applied in an aerosol-containing phase to surface 211 of pressure-sensitive medium 207. In this case, reactants 217, 219 and/or reaction catalyst 221 may be dissolved in the droplets of the aerosol. As an alternative thereto, reactants 217, 219 and/or reaction catalyst 221 in the solid phase may be contained as suspended particles in the aerosol-containing phase of second medium 209. Gaseous or aerosol-containing second medium 209 containing the molecules of first and/or second reactants 217, 219 or of reaction catalyst 221 in dissolved form or in the form of suspended particles may be applied to surface 211 of pressure-sensitive medium 207 with an appropriate concentration of first and/or second reactants 217, 219 or of reaction catalyst 221 in order to perform the phase-transfer reaction, for example by blowing with an appropriate air flow or by forming an appropriate atmosphere containing the second medium and surrounding pressure sensor 200.

As an alternative to the specific embodiment shown, the phase-transfer reaction may be performed without the introduction of excitation energy 223.

The proportions shown in FIGS. 2A-2D are merely of an exemplary nature and do not correspond to the real dimensions of a pressure sensor 200 with the components shown.

What is claimed is:

1. A method for manufacturing a pressure sensor having a pressure-sensitive medium, comprising the following steps:
    providing a pressure sensor having a pressure sensor element, which is arranged in a receiving space of a housing of the pressure sensor;
    dissolving a first reactant in a pressure-sensitive medium or in a second medium and a second reactant in the pressure-sensitive medium or in the second medium;
    filling the receiving space with the pressure-sensitive medium;
    applying the second medium, which is immiscible with the pressure-sensitive medium, to a surface of the pressure-sensitive medium; and
    forming a membrane in a boundary region between the pressure-sensitive medium and the second medium by way of a phase-transfer reaction between the first reactant and the second reactant.

2. The method as recited in claim 1, wherein the first reactant is dissolved in the pressure-sensitive medium and the second reactant is dissolved in the second medium, the formation of the membrane involving a diffusion of molecules of the first reactant into the second medium and/or a diffusion of molecules of the second reactant into the pressure-sensitive medium.

3. The method as recited in claim 1, wherein the membrane is a polymer membrane.

4. The method as recited in claim 1, wherein the membrane is connected to the housing and seals the receiving space.

5. The method as recited in claim 4, wherein the phase-transfer reaction between the first and second reactants may be ended after a predetermined reaction time, when a mechanical property of the membrane is achieved, or once the first and/or second reactant has been consumed.

6. The method as recited in claim 1, wherein the formation of the membrane further includes introducing an external excitation energy into the boundary region between the pressure-sensitive medium and the second medium, the excitation energy being equipped to promote the phase-transfer reaction, and the excitation energy including a thermal energy and/or an energy of electromagnetic radiation.

7. A method for manufacturing a pressure sensor having a pressure-sensitive medium, comprising the following steps:
   providing a pressure sensor having a pressure sensor element, which is arranged in a receiving space of a housing of the pressure sensor;
   filling the receiving space with a pressure-sensitive medium;
   applying a second medium, which is immiscible with the pressure-sensitive medium, to a surface of the pressure-sensitive medium; and
   forming a membrane in a boundary region between the pressure-sensitive medium and the second medium by way of a phase-transfer reaction between a first reactant and a second reactant, at least the first reactant or the second reactant being dissolved in the pressure-sensitive medium or in the second medium, wherein the pressure-sensitive medium and/or the second medium includes a reaction catalyst, the phase-transfer reaction being a phase-transfer catalysis, and the reaction catalyst being configured to initiate a chemical reaction of the first and second reactants.

8. The method as recited in claim 7, wherein the first reactant and the second reactant are dissolved in the second medium, the reaction catalyst being dissolved in the pressure-sensitive medium, and the phase-transfer catalysis involving a diffusion of molecules of the first and second reactants into the pressure-sensitive medium and/or a diffusion of molecules of the reaction catalyst into the second medium.

9. The method as recited in claim 7, wherein the first reactant and the second reactant are dissolved in the pressure-sensitive medium, the reaction catalyst being dissolved in the second medium, and the phase-transfer catalysis involving a diffusion of molecules of the first and second reactants into the second medium and/or a diffusion of molecules of the reaction catalyst into the pressure-sensitive medium.

10. The method as recited in claim 7, wherein: i) the reaction catalyst is suitable for lowering a reaction energy of the chemical reaction between the first and second reactants, and/or ii) the reaction catalyst is suitable for bringing about a diffusion of the first and second reactants from the one medium of the first and second mediums into a respective other medium of the first and second mediums.

11. A method for manufacturing a pressure sensor having a pressure-sensitive medium, comprising the following steps:
   providing a pressure sensor having a pressure sensor element, which is arranged in a receiving space of a housing of the pressure sensor;
   filling the receiving space with a pressure-sensitive medium;
   applying a second medium, which is immiscible with the pressure-sensitive medium, to a surface of the pressure-sensitive medium; and
   forming a membrane in a boundary region between the pressure-sensitive medium and the second medium by way of a phase-transfer reaction between a first reactant and a second reactant, at least the first reactant or the second reactant being dissolved in the pressure-sensitive medium or in the second medium, wherein the pressure-sensitive medium includes a liquid organic oil-containing medium, and wherein the second medium is a water-containing medium having at least one liquid or gaseous or aerosol-containing phase.

12. A pressure sensor, the pressure sensor being formed by:
   providing a pressure sensor having a pressure sensor element, which is arranged in a receiving space of a housing of the pressure sensor;
   dissolving a first reactant in a pressure-sensitive medium or in a second medium and a second reactant in the pressure-sensitive medium or in the second medium;
   filling the receiving space with the pressure-sensitive medium;
   applying the second medium, which is immiscible with the pressure-sensitive medium, to a surface of the pressure-sensitive medium; and
   forming a membrane in a boundary region between the pressure-sensitive medium and the second medium by way of a phase-transfer reaction between the first reactant and the second reactant.

* * * * *